F. G. FLEGAL.
MEANS FOR TREATING VEHICLE TIRES DURING VULCANIZING.
APPLICATION FILED NOV. 7, 1918.
1,340,440. Patented May 18, 1920.
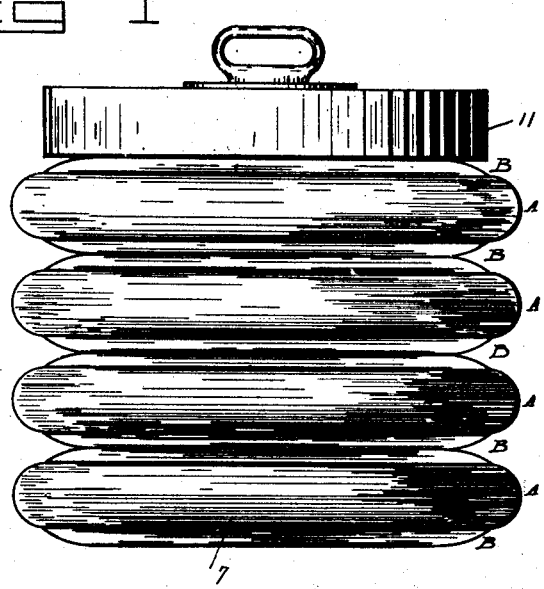
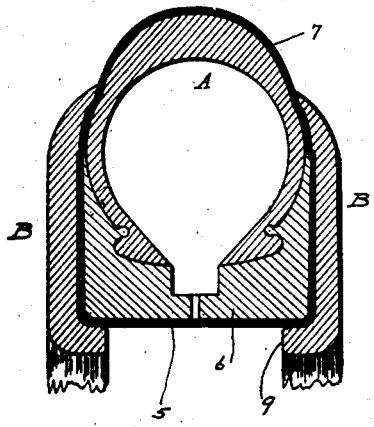
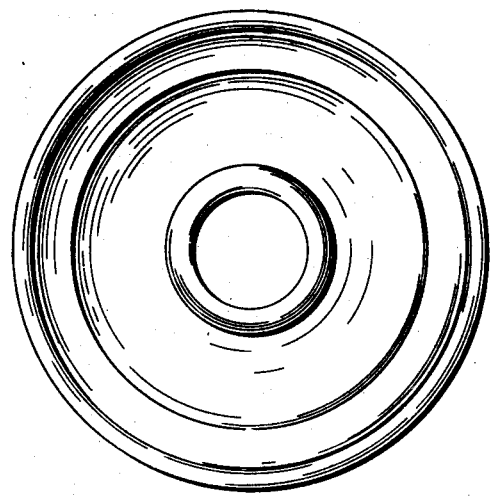
Inventor,
Forrest G. Flegal.
By
His Attorney.

UNITED STATES PATENT OFFICE.

FORREST G. FLEGAL, OF SAN DIEGO, CALIFORNIA, ASSIGNOR TO THE SAVAGE TIRE COMPANY, OF SAN DIEGO, CALIFORNIA, A CORPORATION OF CALIFORNIA.

MEANS FOR TREATING VEHICLE-TIRES DURING VULCANIZING.

1,340,440. Specification of Letters Patent. Patented May 18, 1920.

Application filed November 7, 1918. Serial No. 261,493.

*To all whom it may concern:*

Be it known that I, FORREST G. FLEGAL, a citizen of the United States, residing at San Diego, in the county of San Diego and State of California, have invented a new and useful Means for Treating Vehicle-Tires During Vulcanizing, of which the following is a specification.

This invention relates to improved means and method of vulcanizing vehicle tires, and it has for its object to provide improvements of this character which will be generally superior in point of relative simplicity and inexpensiveness of construction and formation, convenience and positiveness in use, compactness in form, facility in handling and use and practice, and which will be generally superior in efficiency and serviceability.

The invention has for a particular object the provision of improvements of the general character stated which will prevent the swelling or distortion of the sides and tread portions of the vehicle during the vulcanizing process.

With the above and other objects in view, the invention consists in the construction, organization, combination, association and mode of application and method of use, and inter-relation and mode of application of parts, members and features, all as hereinafter described, shown in the drawing, and finally pointed out in claims.

In the drawing:

Figure 1 is a side elevation of a plurality of tire carcasses wrapped and prepared for vulcanizing, a weight being conventionally shown at the top of the stack to hold the uppermost member of the improvements in position;

Fig. 2 is a detail transverse sectional view of a vehicle tire in its vulcanizing mold and vulcanizing wrapping, and having applied to such tire and over such wrapping and mold, the improved means entering into the invention, such improved means being shown at each side of the tire, and only fragmentarily;

Fig. 3 is an inner face view of one member of such improved means entering into the invention; and, Fig. 4 is a central transverse sectional view of the member of the improved means shown in Fig. 3.

Corresponding parts in all the figures are designated by the same reference characters.

Referring with particularity to the drawing, A in each instance designates a tire carcass which is shown in Fig. 2 as positioned in the two halves 5 and 6, of a vulcanizing mold, around which and the tire A is wound the vulcanizing wrapping 7. The improvements of the invention comprise members B of means for preventing the spreading or swelling of the tire at the sides or at the tread portions, that is, to produce a lateral swelling or expansion of the tire; each of such members comprising an annulus 8 provided with a laterally directed internal annular flange 9, such annulus likewise having a laterally curved peripheral portion 10, the curvature of which extends in the same direction as that in which the flange 9 extends. Each of such members B is applied to the tire and its mold and wrapping at one side, as clearly shown in Figs. 1 and 2, with the internal flange 9 fitting into the central opening in the annular vulcanizing mold members 5 and 6; and the lateral curvature 10 of each such member B bears against the tire, or the wrapping 7 over the tire, just outward of or radially beyond the respective mold member 5 or 6, as likewise clearly shown in Fig. 2.

When the tires with their molds and wrappings and members B are stacked one above the other as shown in Fig. 1, and a weight 11 or the like placed upon the uppermost member B to hold it to its work, or a press or any other agency is applied for that purpose, and also if desired, for the purpose of causing a thorough and efficient application of all of the members B to the respective tire carcasses, alternately above one and below the next, any distortion of the tire carcass at its sides, or where the sides merge into the tread portions, that is, radially outward of the tire molds, is prevented, and the vulcanized tire comes from the vulcanizer in proper form and conformation and devoid of any distortion or lateral spreading or expansion.

Thus the undesirable distortion and spreading and expansion which is liable to occur in the ordinary vulcanizing action in the treatment of tire carcasses is prevented, and the tire carcasses remain true and in perfect conformation and of proper uniform transverse dimension.

It is manifest that many changes and variations may be made, both as to structure and method of use and procedure and mode of operation, and specific mode of application of parts and features, all with respect to the disclosure of the drawing and the foregoing description, without departing from the true spirit of the invention.

Having thus disclosed my invention, I claim and desire to secure by Letters Patent:

1. A device of the character described including a bead mold adapted to embrace the base of a tire carcass, in combination with pressure rings fitted removably against the sides of the bead mold and extending beyond the same into engagement with the sides of the tire to prevent lateral distortion thereof, said pressure rings being adapted to be held in position by superposing a number of the molds and rings upon each other.

2. A device of the character described, including a bead mold adapted to embrace the base of a tire carcass, in combination with pressure rings applied removably to opposite sides of the mold and extending beyond the mold to engage the sides of a tire carcass and prevent lateral distortion thereof, said pressure rings fitting flatly against the bead mold and having smooth outer faces which mutually engage each other when a number of molds with the pressure rings applied thereto are superposed upon each other.

3. A device of the character described, including a bead mold adapted to embrace the base of a tire carcass, and similar and interchangeable pressure rings fitted loosely against opposite sides of the bead mold and formed with positioning flanges entering the bead mold and also with inwardly deflected edge portions which extend beyond the bead mold and engage the sides of the tire carcass to prevent lateral distortion thereof, the outer faces of the pressure rings being formed with corresponding bearing surfaces adapted to loosely engage each other when a number of the molds with the pressure rings applied thereto are superposed upon each other to lock the pressure rings in position by the weight of the superposed members.

4. A device of the character described, including a bead mold adapted to embrace the base of a tire carcass, in combination with pressure rings fitted removably against the sides of the bead mold and having corresponding flat outer faces which are adapted to loosely engage each other when a number of the molds with the pressure rings applied thereto are superposed upon each other to lock the pressure rings in position by the weight of the superposed members.

In testimony whereof I have signed my name to this specification in the presence of two subscribing witnesses.

FORREST G. FLEGAL.

Witnesses:
CLAUS SPRECKELS,
A. R. BOWMAN.